US012597797B2

(12) United States Patent
     Higo

(10) Patent No.: US 12,597,797 B2
(45) Date of Patent: Apr. 7, 2026

(54) POWER FEEDING DEVICE, POWER FEEDING METHOD, AND RECORDING MEDIUM

(71) Applicant: CASIO COMPUTER CO., LTD., Tokyo (JP)

(72) Inventor: Tomio Higo, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 93 days.

(21) Appl. No.: 18/229,464

(22) Filed: Aug. 2, 2023

(65) Prior Publication Data

US 2024/0047989 A1    Feb. 8, 2024

(30) Foreign Application Priority Data

Aug. 3, 2022    (JP) ................................. 2022-124128

(51) Int. Cl.
     *H02J 7/00*      (2006.01)
     *H02J 50/10*     (2016.01)
     *H02J 50/60*     (2016.01)
(52) U.S. Cl.
     CPC ........ *H02J 7/007192* (2020.01); *H02J 50/10* (2016.02); *H02J 50/60* (2016.02)
(58) Field of Classification Search
     CPC ...................................................... H02J 50/12
     See application file for complete search history.

(56) References Cited

U.S. PATENT DOCUMENTS

| | | | | |
|---|---|---|---|---|
| 2005/0180113 A1* | 8/2005 | Shirakami | ........... | F28D 15/0233 |
| | | | | 257/E23.09 |
| 2012/0114013 A1* | 5/2012 | Tsuchida | ................ | G01K 13/20 |
| | | | | 374/185 |
| 2013/0163635 A1* | 6/2013 | Karanth | .................. | H02J 50/60 |
| | | | | 374/45 |

FOREIGN PATENT DOCUMENTS

| | | |
|---|---|---|
| JP | 2003-153457 A | 5/2003 |
| JP | 2009-022126 A | 1/2009 |
| JP | 2014-093921 A | 5/2014 |
| JP | 2015-195633 A | 11/2015 |
| JP | 2016-007100 A | 1/2016 |

(Continued)

OTHER PUBLICATIONS

JPO; Application No. 2022-124128; Notice of Reasons for Refusal dated Jul. 23, 2024.

*Primary Examiner* — Daniel Kessie
(74) *Attorney, Agent, or Firm* — Fitch, Even, Tabin & Flannery LLP

(57)                ABSTRACT

A power receiving device includes: a placement portion; a power feeder including a coil; a thermal conduction member disposed at a location that is located between the power receiving device and the coil control of stopping power feeding by the power feeder a processor to perform control of stopping power feeding by the power feeder in a case where after start of power feeding by the power feeder at a predetermined timing, temperature of the thermal conduction member detected by the sensor satisfies a predetermined condition. the power receiving device is placed on the placement surface and having a higher thermal conductivity than the placement portion; a sensor to detect temperature of the thermal conduction member; and a processor to perform control of stopping power feeding by the power feeder in a (Continued)

case where, temperature of the thermal conduction member
detected by the sensor satisfies a predetermined condition.

15 Claims, 7 Drawing Sheets

(56) References Cited

FOREIGN PATENT DOCUMENTS

| | | | |
|---|---|---|---|
| JP | 2022-006922 | A | 1/2022 |
| WO | 2014030294 | A1 | 2/2014 |

* cited by examiner

FRONT ⬌ REAR

POWER FEEDING DEVICE, POWER FEEDING METHOD, AND RECORDING MEDIUM

CROSS-REFERENCE TO RELATED APPLICATION

This application claims the benefit of Japanese Patent Application No. 2022-124128, filed on Aug. 3, 2022, the entire disclosure of which is incorporated by reference herein.

FIELD OF THE INVENTION

The present disclosure relates to a power feeding device, a power feeding method, and a recording medium.

BACKGROUND OF THE INVENTION

Various ideas for preventing temperature of a non-contact charging device from rising too high due to existence of a metal foreign object on a charging base in the charging device have been applied. For example, in Unexamined Japanese Patent Application Publication No. 2003-153457, a non-contact charging device that includes a temperature sensor to detect temperature of a power transmitting coil and reduces charging current when temperature during charging becomes greater than or equal to a predetermined temperature is disclosed.

SUMMARY OF THE INVENTION

A power feeding device according to the present disclosure includes:
- a placement portion including a placement surface on which a power receiving device is placed;
- a power feeder including a coil for feeding power to the power receiving device placed on the placement surface;
- a thermal conduction member disposed at a location that is located between the power receiving device and the coil in a case where the power receiving device is placed on the placement surface and having a higher thermal conductivity than the placement portion;
- a sensor to detect temperature of the thermal conduction member; and
- a processor to perform control of stopping power feeding by the power feeder in a case where after start of power feeding by the power feeder at a predetermined timing, temperature of the thermal conduction member detected by the sensor satisfies a predetermined condition.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Hereinafter, an embodiment of the present disclosure is described with reference to the drawings. Note that, to facilitate understanding of the embodiment, the description is made appropriately referring to up and down directions in FIGS. 1 and 2.

Embodiment

First, a configuration of a power feeding device 100 according to the embodiment is described with reference to FIGS. 1 to 5. The power feeding device 100 is a device that feeds a power receiving device included in a robot 200 illustrated in FIG. 1 with electricity.

Figure 1:
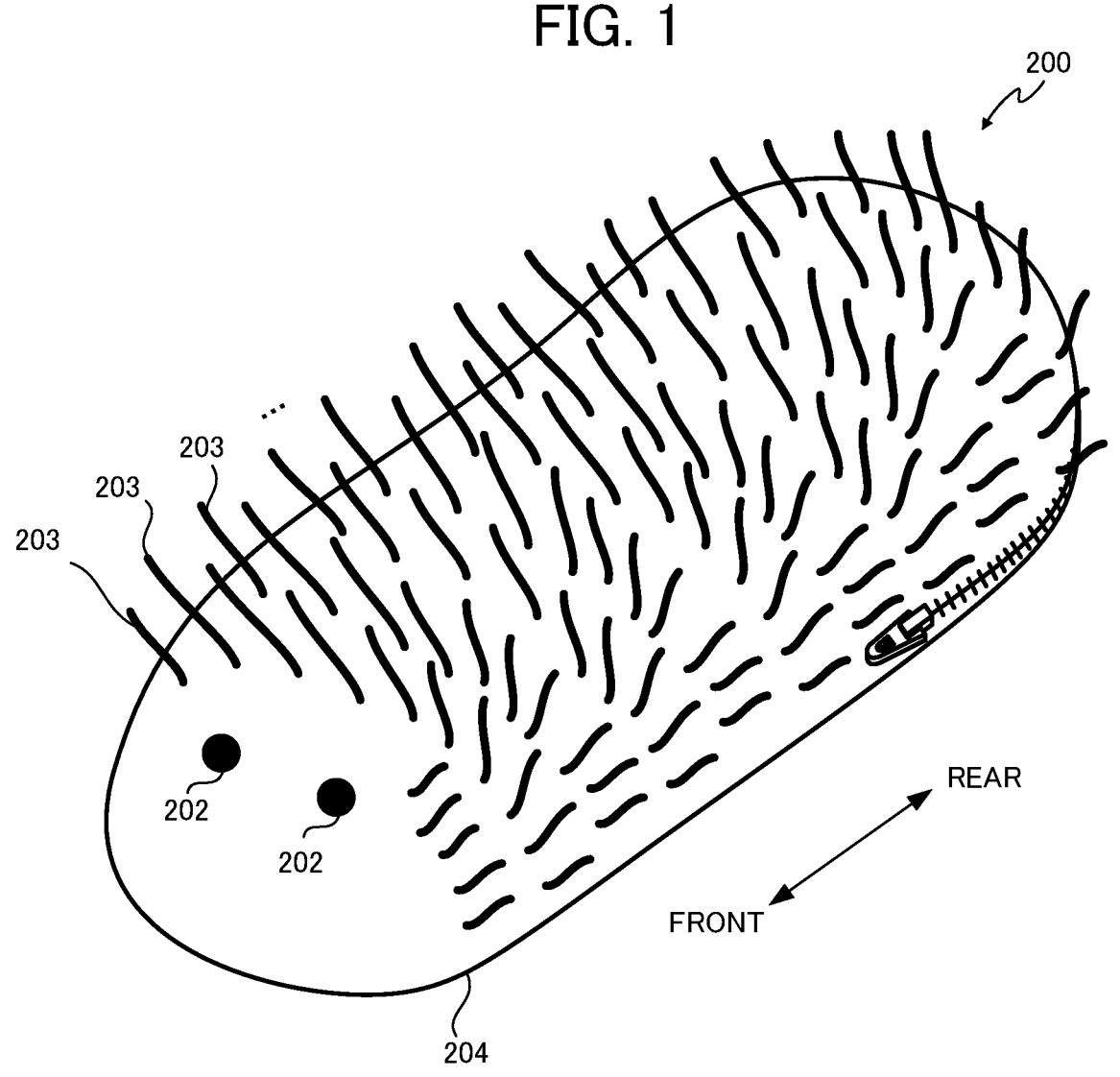
FIG. 1 is a perspective view of a robot according to an embodiment of the present disclosure.
Figure 2:
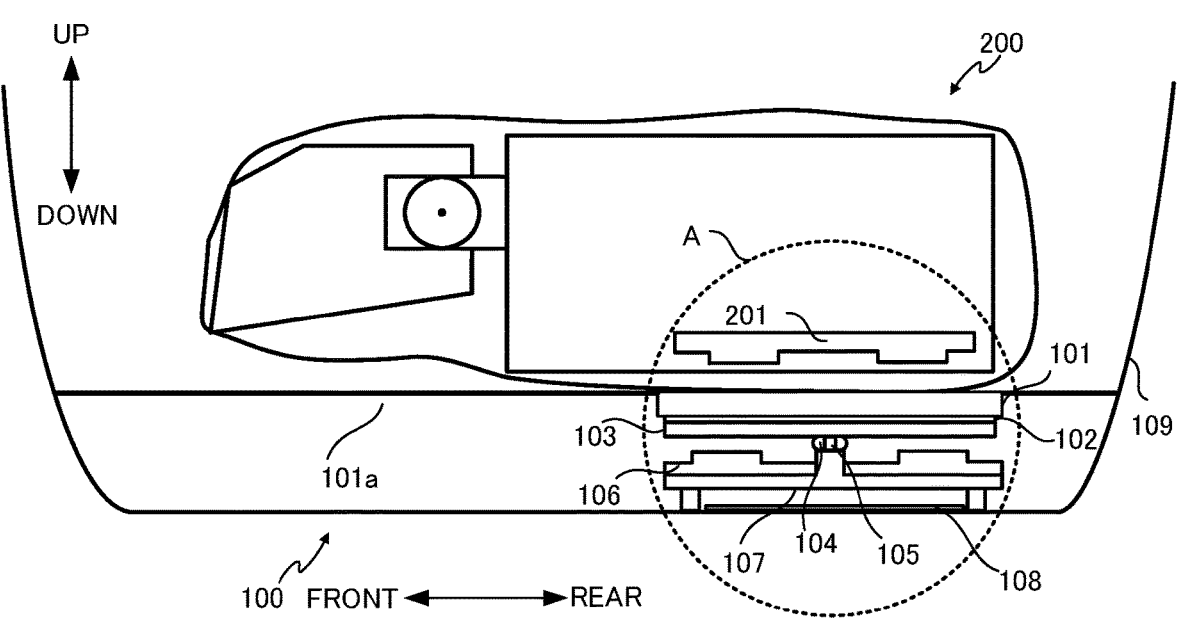
FIG. 2 is a cross-sectional view illustrating a power feeding device and the robot including a power receiving device according to the embodiment of the present disclosure, the robot being placed on the power feeding device, when viewed from a lateral side.

The robot 200 in the embodiment is a pet robot that imitates a small animal. As illustrated in FIG. 1, the robot 200 is provided, on the front side, with two decorative members 202 that imitate the eyes of the small animal. The robot 200 also has an exterior 204 that is provided with hairs 203 imitating hairs of the small animal. In addition, as illustrated in FIG. 2, the robot 200 is provided with a power receiving coil 201 that is a power receiving device. The power receiving coil 201 is, for example, a planar coil that is wound in a spiral shape, and a coil surface of the power receiving coil 201 is arranged in such a manner as to be parallel with the upper surface of a coil cover 101 that is a placement surface of the power feeding device 100.

The power receiving coil 201 receives power by magnetic field coupling, such as electromagnetic induction, with a power transmitting coil 106 provided to the power feeding device 100. Power that the power receiving coil 201 receives is output to a charging circuit, the illustration of which is omitted. The charging circuit rectifies and converts AC power that the power receiving coil 201 receives to DC current and charges a secondary battery, the illustration of which is omitted. Because of this configuration, power can be supplied in a non-contact manner from the power feeding device 100 to the secondary battery of the robot 200. Therefore, the power transmitting coil 106 corresponds to a power feeding member. In addition, although, in the embodiment, an example in which a non-contact charging method is performed by the power transmitting coil 106 and the power receiving coil 201 is described, the present disclosure is not limited to the example. Specifically, any method of non-contact power feeding can be used as long as the method performs non-contact power feeding by making use of magnetic field.

The power feeding device 100 includes, as illustrated in FIG. 2, the coil cover 101, a floor surface 101*a*, a thermal conduction member 103, a pressing member 104, a temperature sensor 105, the power transmitting coil 106, a pedestal 107, a substrate 108, and an outer frame 109.

The coil cover 101 corresponds to a placement portion on which the robot 200 is placed. In addition, the coil cover 101 is formed of a material different from metal so that the coil cover 101 does not generate heat when power feeding by the power transmitting coil 106 is performed. In the embodiment, the coil cover 101 is formed of an insulating material, such as plastic. Note that the coil cover 101 may be made of a smooth material, such as polytetrafluoroethylene (PTFE), that has low friction with the robot 200. The floor surface 101*a* is made of an insulating material, such as plastic. Note that, as with the coil cover 101, the floor surface 101*a* may also be made of polytetrafluoroethylene (PTFE).

Figure 3:
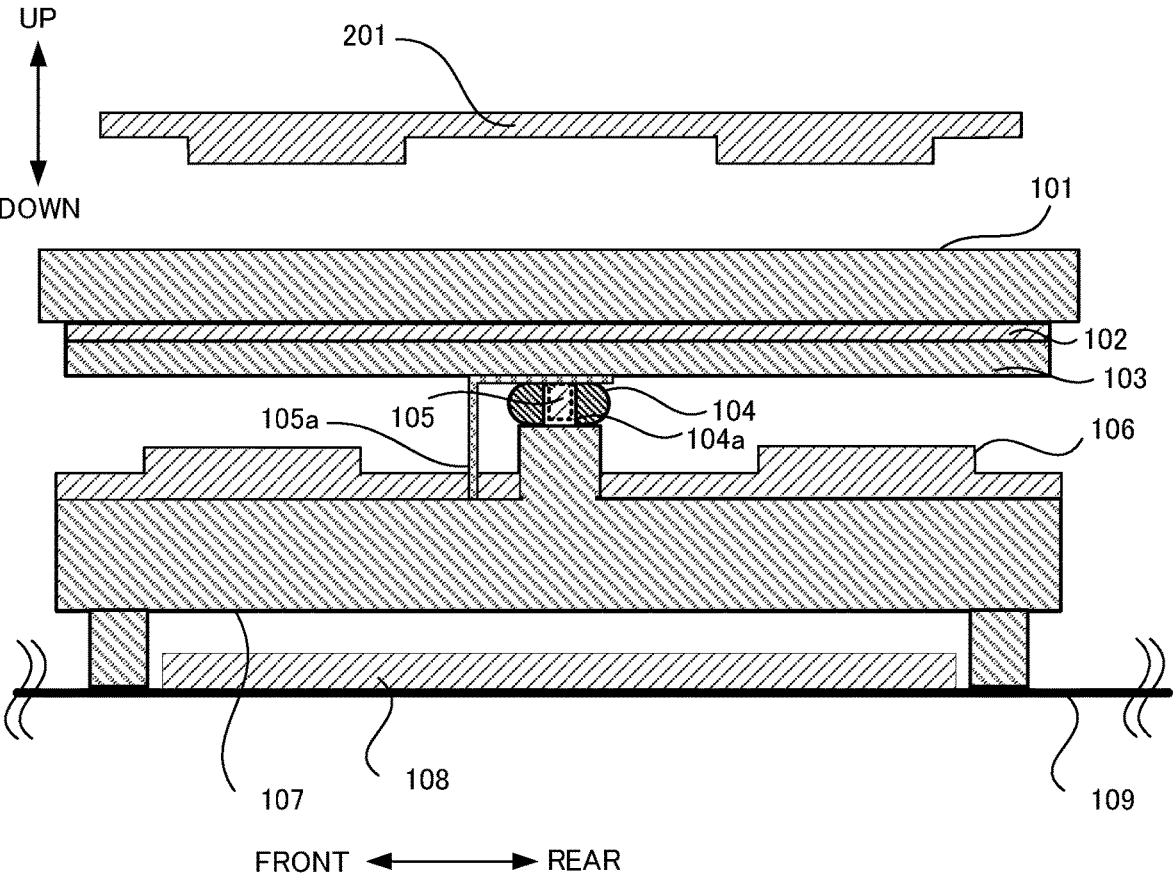
FIG. 3 is an enlarged cross-sectional view of the power feeding device according to the embodiment of the present disclosure.

As illustrated in FIG. 3, on the under surface side of the coil cover 101, the thermal conduction member 103 is attached with a thermal conductive double-faced adhesive tape 102. The thermal conduction member 103 is a sheet that is formed of, for example, an acrylic material. Note that the thermal conduction member 103 may be formed of a silicon-based material in addition to an acrylic material. In addition, the thermal conductive double-faced adhesive tape 102 is, for example, a double-faced adhesive tape in which acrylic adhesive having thermal conductivity is applied to both surfaces of polyetheretherketone (PEEK) resin. Note that the thermal conductive double-faced adhesive tape 102 may include only acrylic adhesive having thermal conductivity or may be a double-faced adhesive tape in which acrylic adhesive having thermal conductivity is applied to both surfaces of polyethylene terephthalate (PET) film. Note that the thermal conduction member 103 is made of a material that has a higher thermal conductivity than the coil cover 101.

The pressing member 104 is formed of a material that has elasticity, such as rubber. In addition, the pressing member 104 is disposed at a location near the center of a lower part of the thermal conduction member 103 in such a manner as to cover the circumference of the temperature sensor 105. More specifically, a through-hole 104*a* is formed in the pressing member 104, and the pressing member 104 is arranged in such a manner that the temperature sensor 105 is positioned on the inside of the through-hole 104*a*.

Figure 4:
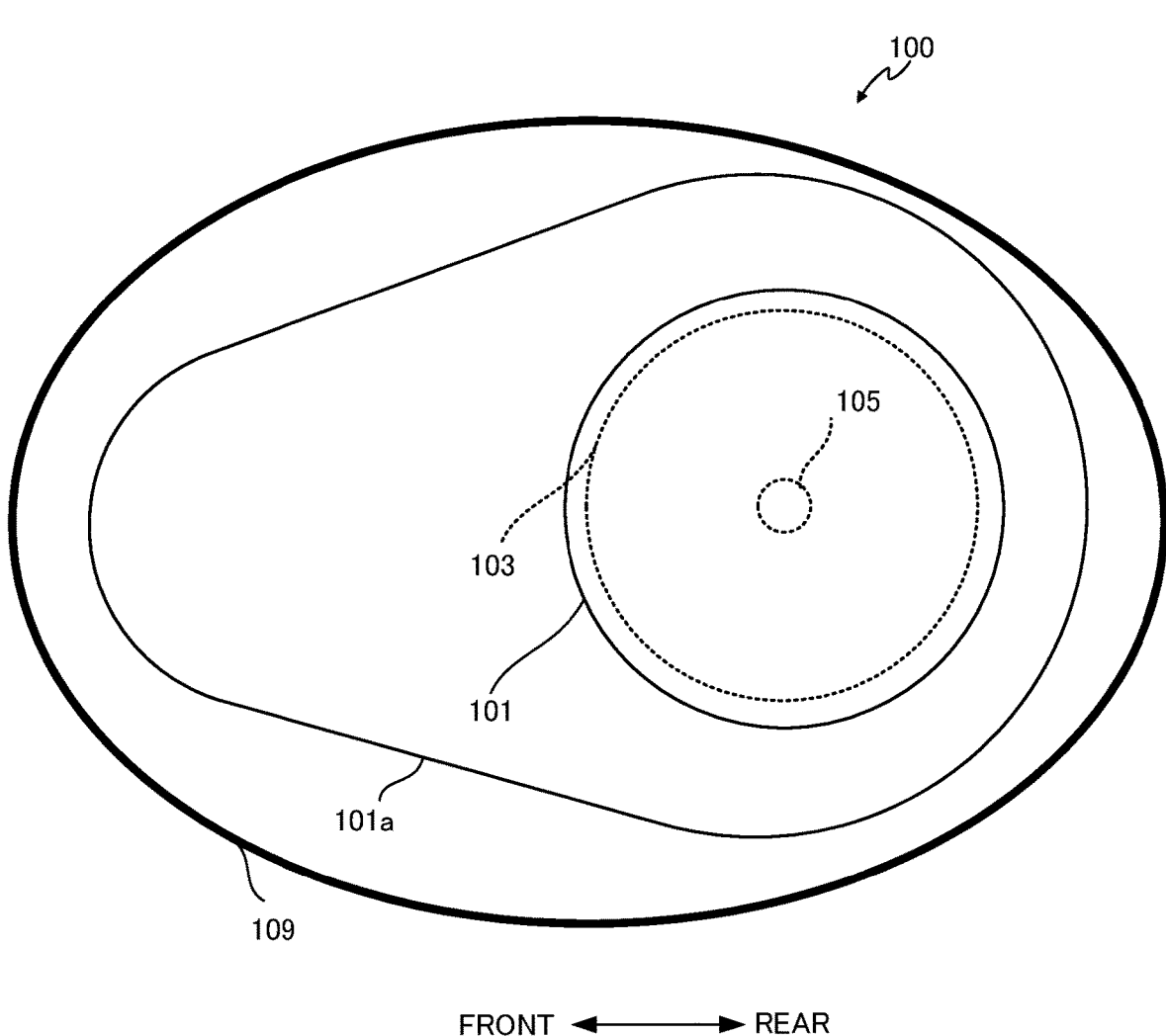
FIG. 4 is a diagram illustrating the power feeding device according to the embodiment of the present disclosure when viewed from above.

The temperature sensor 105 is a sensor for detecting temperature of the thermal conduction member 103, is a contact-type temperature sensor, such as a resistance temperature detector, a linear resistor, and a thermistor, and is disposed at the center of a lower part of the thermal conduction member 103 as illustrated by a dotted line in FIG. 4. In other words, the temperature sensor 105 is arranged at a location that is located on the opposite side of the coil cover 101 to the side on which the robot 200 is placed and corresponds to the central position of the thermal conduction member 103.

In the embodiment, the temperature sensor 105 is mounted on a flexible printed wiring board 105*a*. In addition, temperature information detected by the temperature sensor 105 is transmitted to an electronic component mounted on the substrate 108 via the flexible printed wiring board 105*a*. Note that, as the flexible printed wiring board 105*a*, for example, a printed wiring board in which a circuit pattern is formed on a film that is made of resin or the like having a high thermal conductivity is used.

In addition, the pressing member 104 is arranged in such a way that the flexible printed wiring board 105*a* is pressed against the thermal conduction member 103 by the pressing member 104. This configuration causes the pressing member 104, the flexible printed wiring board 105*a*, and the thermal conduction member 103 to come into close contact with each other. In addition, even when a metal foreign object exists on the coil cover 101 and generates heat at the time of power feeding by the power transmitting coil 106, this configuration enables the heat to be easily conducted to the temperature sensor 105 via the coil cover 101, the thermal conductive double-faced adhesive tape 102, the thermal conduction member 103, and the flexible printed wiring board 105*a*. Note that the temperature sensor 105 corresponds to a temperature detector.

In addition, as described above, the temperature sensor 105 is arranged on the inside of the through-hole 104*a*, which is formed in the pressing member 104. Thus, the temperature sensor 105 is in contact with the flexible printed wiring board 105*a* at a portion (specifically, a region on the inner side of a peripheral portion of the through-hole 104*a*) that is different from a portion at which the pressing member 104 and the flexible printed wiring board 105*a* are in contact with each other (specifically, the peripheral portion of the through-hole 104*a*). That is, when the pressing member 104 is not arranged, there is a possibility that a load is undesirably applied to the temperature sensor 105 since the thermal conduction member 103 is required to be pressed against the flexible printed wiring board 105*a* by the temperature sensor 105. In contrast, according to the embodiment, since the temperature sensor 105 is arranged in such a way as to come into contact with the flexible printed wiring board 105*a* that is being pressed against the thermal conduction member 103 by the pressing member 104, it is possible to prevent a load from being undesirably applied to the temperature sensor 105.

Note that the pressing member 104 may be configured to function as a cushion for protecting the temperature sensor 105. The pressing member 104 may also be configured to function as a cushion by causing the pressing member 104 to generate repulsive force matching the force of gravity of the robot 200 placed on the coil cover 101.

In addition, configuring the temperature sensor 105 to detect temperature at a location corresponding to the central position of the thermal conduction member 103, which is arranged on the lower surface side of the coil cover 101, enables production cost of the power feeding device 100 to be reduced. More specifically, when the thermal conduction member 103 is not provided, temperature sensors need to be disposed at a plurality of locations in order to detect temperature changes at a central portion and vicinity portions of the periphery of the coil cover 101 and, as a result, disposing the temperature sensors costs as much as the number of temperature sensors. In contrast, the present embodiment is configured such that heat generated from a metal foreign object is transmitted to the temperature sensor 105 via the thermal conduction member 103. Thus, by the temperature sensor 105 that is arranged at a location corresponding to the central position of the thermal conduction member 103, temperature change at not only a portion in a vicinity of the center of the coil cover 101 but also other portions of the coil cover 101 can be detected. As described above, the thermal conduction member 103 functions as a member for conducting heat generated from a metal foreign object to the temperature sensor 105. The thermal conduction member 103 also functions as a member for relaxing a rise in temperature of a metal foreign object by dispersing heat from the metal foreign object having generated heat.

In addition, the coil cover 101 is, as described above, made of a material having a lower thermal conductivity than the thermal conduction member 103. Thus, the coil cover 101 functions as a thermal insulation layer that is less likely to conduct heat compared with a thermal conduction layer that is formed of the thermal conduction member 103. In this case, since, even when a metal foreign object generates heat, the heat is made less likely to diffuse to a wide area on the coil cover 101, it is possible to prevent heat generated from a metal foreign object from being conducted to the robot 200.

The power transmitting coil 106 is, for example, a planar coil that is wound in a spiral shape, and a coil surface of the power transmitting coil 106 is arranged in such a manner as to be parallel with the upper surface of a coil cover 101. That is, the power transmitting coil 106 is arranged in such a manner as to directly face the power receiving coil 201 of the robot 200 that is placed on the coil cover 101, as illustrated in FIGS. 2 and 3. Note that, in the embodiment, DC voltage supplied from an AC adapter that is disposed outside or inside the power feeding device 100 and is connected to a household outlet is converted to AC, and power is transmitted from the power transmitting coil 106.

The pedestal 107 is made of an insulating material, such as plastic, and, on the upper surface of the pedestal 107, the power transmitting coil 106 is arranged, as illustrated in FIGS. 2 and 3.

The substrate 108 is made of a printed substrate on which various types of electronic components are to be mounted. Specifically, on the substrate 108, a micro computer including at least one central processing unit (CPU), read only memory (ROM), and random access memory (RAM) or a field-programmable gate array (FPGA), a memory that stores various types of information, and the like are mounted.

The outer frame 109 is made of an insulating material, such as plastic. Note that, although an example in which the outer frame 109 in the embodiment has an elliptical shape as illustrated in FIG. 4 is described, the shape is only an example and the shape of the outer frame 109 is not limited to an elliptical shape. For example, the outer frame 109 may have a shape in which the front side expands wider than the rear side, that is, a so-called ovoid shape. In addition, on the outer frame 109, a notifier that notifies a user of existence of a metal foreign object, such as a lamp like an LED and a speaker, is provided (illustration is omitted).

As illustrated in FIG. 4, the power feeding device 100 in the embodiment has a shape that forms an ellipse when the power feeding device 100 that is placed on a placement surface, such as a table, is viewed from above. In addition, on the under surface side of the circular coil cover 101, the circular thermal conduction member 103 is attached with a thermal conductive double-faced adhesive tape 102 (see FIG. 2). At a location corresponding to a central portion of the circular thermal conduction member 103, the temperature sensor 105 is disposed. Note that, although, in the illustrated example, an example in which the coil cover 101 and the thermal conduction member 103 are circular is described, the shapes of the coil cover 101 and the thermal conduction member 103 are not limited to a circle and may be, for example, an ellipse or a polygon. The shape of the thermal conduction member 103 is only required to be a shape matching the shape of the coil cover 101.

Figure 5:
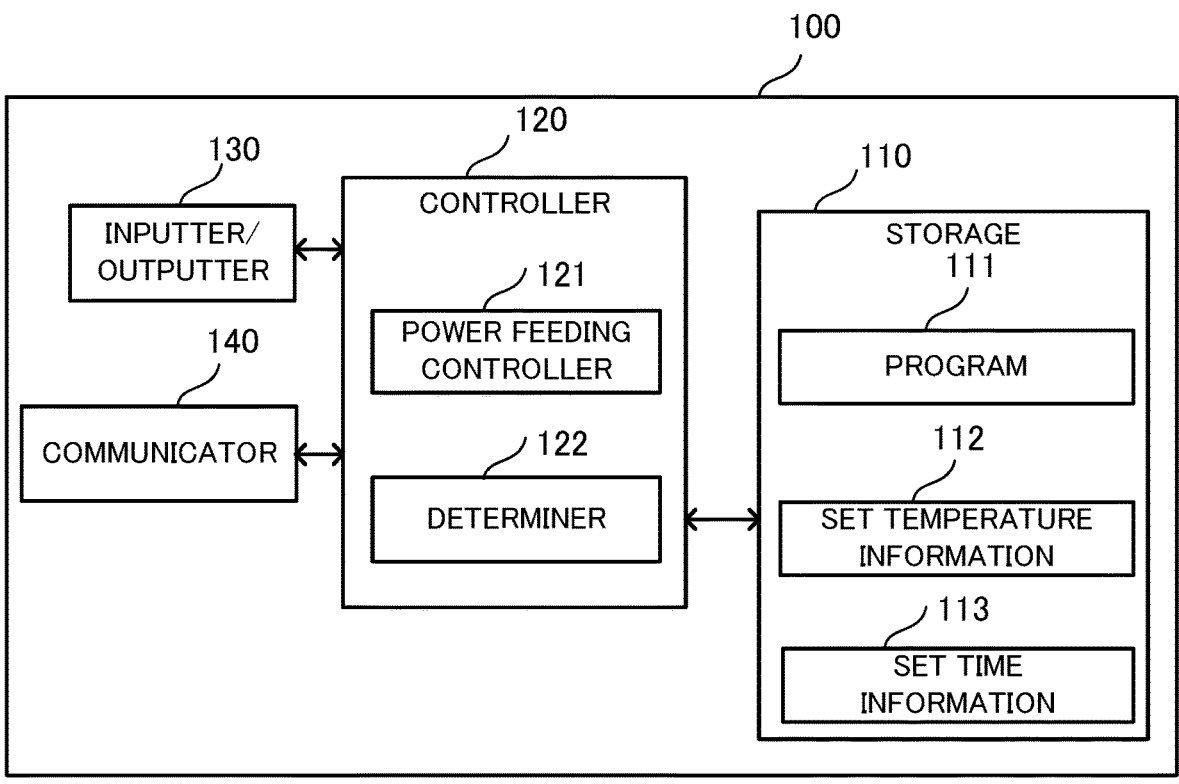
FIG. 5 is a block diagram illustrating an example of the power feeding device according to the embodiment of the present disclosure.

Next, each functional unit of the power feeding device 100 in the embodiment is described with reference to FIG. 5. As illustrated in FIG. 5, the power feeding device 100 includes a storage 110, a controller 120, an inputter/outputter

130, a communicator 140, and a system bus (illustration is omitted) that connects the foregoing functional units to one another. Note that the functional units are achieved by a micro computer including a CPU, a ROM, and a RAM or an FPGA and a memory storing various types of information that are mounted on the substrate 108.

The storage 110 is a storage device, such as a ROM, a RAM, and a flash memory, and stores various types of data (illustration is omitted) required in advance in executing a program 111 that the CPU of the controller 120 executes, set temperature information 112, and set time information 113.

The program 111 is a program that executes power feeding control processing, which is described later, and is stored in advance in the storage 110.

In the set temperature information 112, a plurality of temperatures from a first set temperature to an n-th set temperature (n is an integer of 2 or more that the user sets) are set by the user as preset temperatures. Note that the temperatures that are set as the set temperature information 112 are temperatures that, in the power feeding control processing, which is described later, serve as criteria for comparison with temperature rise of the thermal conduction member 103 detected by the temperature sensor 105.

In the set time information 113, an n-th set time corresponding to the n-th set temperature is set in advance by the user with respect to each set temperature set by the set temperature information 112, such as 1 second being set as a first set time corresponding to the first set temperature (for example, 3 degrees) and 3 seconds being set as a second set time corresponding to the second set temperature (for example, 5 degrees). In addition, the second set temperature is a temperature higher than the first set temperature, and the n-th set temperature is only required to be set in such a manner that the larger the value of n is, the higher the n-th set temperature is. In addition, the second set time is a time longer than the first set time, and the n-th set time is only required to be set in such a manner that the larger the value of n is, the longer the n-th set time is.

The controller 120 includes a CPU, an FPGA, or the like. The controller 120 operates in accordance with the program 111 stored in the storage 110 and executes processing in accordance with the program 111. The controller 120 includes a power feeding controller 121 and a determiner 122 as main functional units provided by the program 111 stored in the storage 110.

The power feeding controller 121 is a functional unit that performs control to start, continue, or stop power feeding to the robot 200, depending on a determination result by a function of the determiner 122.

The determiner 122 is a functional unit that performs various types of determination. The determiner 122 has a function of determining whether or not the robot 200 is placed on the power feeding device 100 by, for example, determining whether or not communication between a communicator of the robot 200 and the communicator 140 of the power feeding device 100 is established. The determiner 122 also determines whether or not an allowable condition for continuing power feeding is satisfied, based on speed of temperature change of the thermal conduction member 103 that is detected by the temperature sensor 105. More specifically, the determiner 122 determines whether the allowable condition for continuing power feeding is not satisfied, whether the allowable condition for continuing power feeding is satisfied, or whether a temporary allowable condition for continuing power feeding is satisfied.

In this processing, determining that the allowable condition for continuing power feeding is not satisfied corresponds to determining that a metal foreign object exists on the coil cover 101 and, when power feeding by the power transmitting coil 106 is continued, there is a possibility that temperature of the metal foreign object reaches a preset temperature (for example, 70 degrees). Note that the above-described 70 degrees is an example of a preset temperature and the preset temperature is set to a different temperature according to an aim.

In contrast, determining that the allowable condition for continuing power feeding is satisfied corresponds to determining that no metal foreign object exists on the coil cover 101 or there exists no metal foreign object the temperature of which reaches a preset temperature (for example, 70 degrees) even when power feeding by the power transmitting coil 106 is continued. The embodiment is configured such that a case where no metal foreign object exists and a case where, although a metal foreign object exists, temperature of the metal foreign object does not reach 70 degrees are not distinguished from each other and both cases are collectively determined to satisfy the allowable condition for continuing power feeding. In addition, determining that the temporary allowable condition for continuing power feeding is satisfied corresponds to not only not determining that the allowable condition for continuing power feeding is not satisfied but also not determining that the allowable condition for continuing power feeding is satisfied but determining that a condition for continuing power feeding is temporarily satisfied.

For the purpose of setting a condition for performing the determination described above by the controller 120, the embodiment is also configured such that data when power feeding to the robot 200 placed on the coil cover 101 is performed with a metal foreign object arranged on the coil cover 101 are acquired. More specifically, data about change in the temperature of the metal foreign object at the time of power feeding, change in detected temperature by the temperature sensor 105, and time required for the temperature detected by the temperature sensor 105 to rise by a predetermined temperature are acquired. Based on the acquired data, an n-th set temperature and an n-th set time corresponding to the n-th set temperature are each set. For example, based on data in the case where, when power feeding is continued, foreign object temperature reached 70 degrees, a condition for determining that, when power feeding is continued, there is a possibility that the temperature of the metal foreign object exceeds 70 degrees can be set.

The determiner 122 has a function of comparing detected temperature with each set temperature indicated by the set temperature information 112, as well as comparing a time at which the detected temperature becomes greater than or equal to the set temperature with each set time indicated by the set time information 113. Further, the determiner 122 has a function of determining whether or not the robot 200 has been fully charged. Additionally, the determiner 122 has a function of performing necessary determination in the power feeding control processing, which is described later.

The inputter/outputter 130 is a functional unit for inputting and outputting various types of data, such as temperature information of the thermal conduction member 103 detected by the temperature sensor 105 and information for notifying the user of existence of a metal foreign object.

The communicator 140 is a functional unit for the power feeding device 100 to communicate with the robot 200 via the communicator of the robot 200.

The functional units described above collaborating with one another causes the power feeding device 100 to achieve a function of starting power feeding when the robot 200 is placed on the power feeding device 100 and stopping power feeding when the temperature of the thermal conduction member 103 satisfies a predetermined condition.

Figure 6:
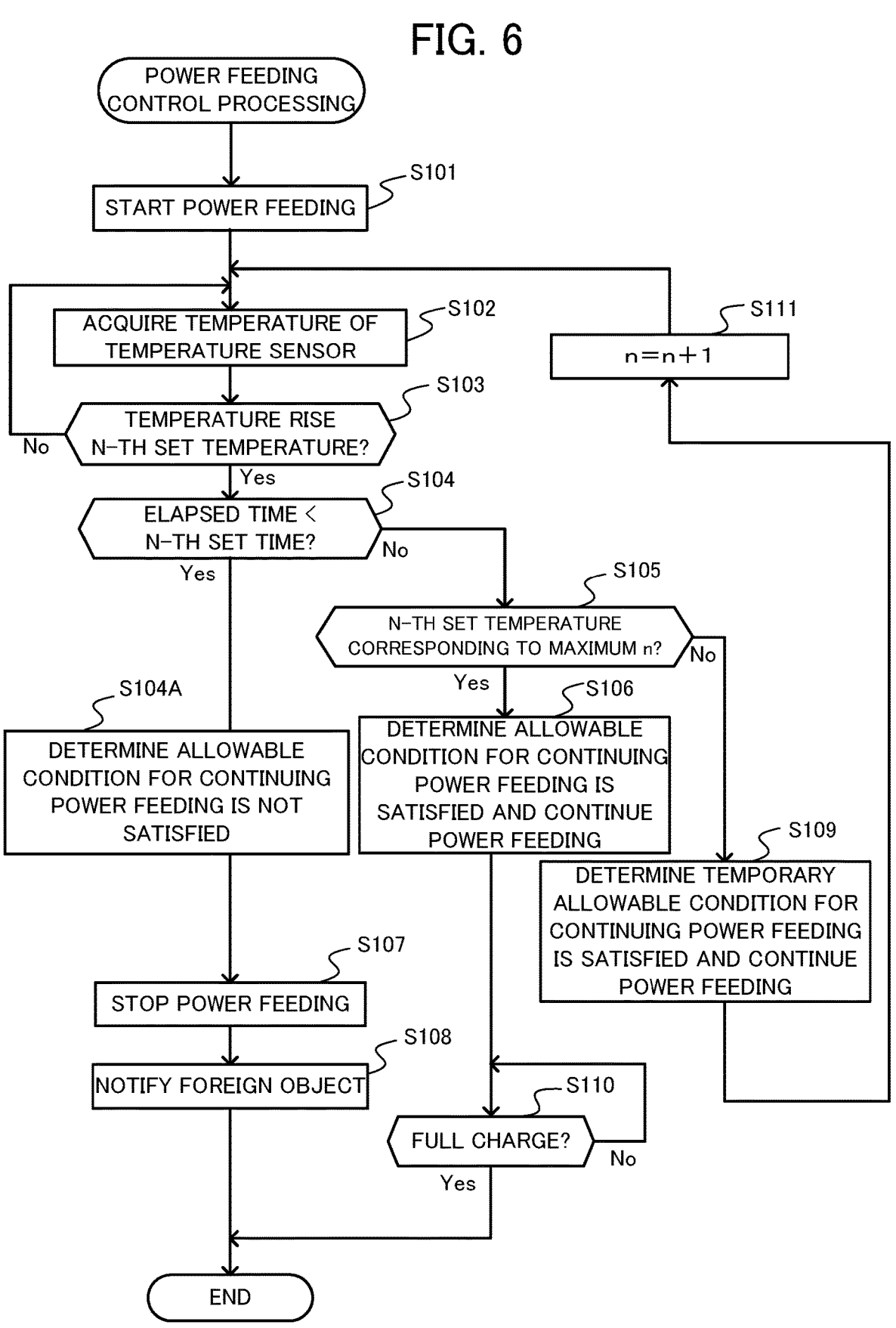
FIG. 6 is a flowchart illustrating an example of power feeding control processing according to the embodiment of the present disclosure.

The configuration of the power feeding device 100 has been described above. Succeedingly, operation of the power feeding device 100 is described. FIG. 6 is a flowchart illustrating an example of the power feeding control processing that is executed in the power feeding device 100. The execution of the power feeding control processing is started by the determiner 122 determining that communication between the communicator of the robot 200 and the communicator 140 of the power feeding device 100 is established. That is, the execution of the power feeding control processing is started when the robot 200 is set on the power feeding device 100. Note that the embodiment is described using as an example a case where the first to fifth set temperatures are set as the set temperature information 112 (that is, using a case where n=5 as an example). Note that an initial value of n is 1 and n is cleared to 1, which is the initial value, every time the power feeding control processing is finished.

When the controller 120 starts the power feeding control processing illustrated in FIG. 6, the controller 120 first starts power feeding to the robot 200 by the function of the power feeding controller 121 (step S101). Specifically, in step S101, the controller 120 starts supply of power through magnetic field coupling between the power transmitting coil 106 of the power feeding device 100 and the power receiving coil 201 of the robot 200. Note that, in the processing in step S101, the controller 120 also acquires temperature of the thermal conduction member 103 immediately after the start of power feeding in a similar manner to step S102, which is described later. In addition, after the controller 120 started power feeding in the processing in step S101, the controller 120 starts measurement by a timer and measures elapsed time from the start of power feeding.

After the controller 120 executed the processing in step S101, the controller 120 acquires temperature of the thermal conduction member 103 (step S102). Specifically, in the processing in step S102, the controller 120 acquires temperature information of the thermal conduction member 103 detected by the temperature sensor 105 via the inputter/outputter 130.

After the controller 120 executed the processing in step S102, the controller 120 determines whether or not temperature rise of the thermal conduction member 103 is greater than or equal to the n-th set temperature by the function of the determiner 122 (step S103). Specifically, in step S103, the controller 120 calculates (derives) temperature rise of the thermal conduction member 103 by subtracting the temperature of the thermal conduction member 103 acquired in the processing in step S101 from the temperature of the thermal conduction member 103 acquired in step S102. The controller 120 determines whether or not the calculated temperature rise is greater than or equal to the first set temperature indicated by the set temperature information 112 stored in the storage 110.

When, in the processing in step S103, the controller 120 determines that the temperature rise of the thermal conduction member 103 is less than the n-th set temperature, that is, less than the first set temperature in this example (step S103; No), the controller 120 returns to the processing in step S102 while continuing power feeding and acquires temperature of the thermal conduction member 103 again.

In contrast, when the controller 120 determines that the temperature rise of the thermal conduction member 103 is greater than or equal to the n-th set temperature, that is, greater than or equal to the first set temperature (for example, 3 degrees) in this example (step S103; Yes), the controller 120 determines whether or not the elapsed time is less than the first set time (for example, 1 second) by the function of the determiner 122 (step S104). Specifically, in step S104, the controller 120 determines whether or not the elapsed time that the controller 120 started to measure in the processing in step S101 is less than the first set time that corresponds to the first set temperature and is indicated by the set time information 113 stored in the storage 110.

When, in step S104, the controller 120 determines that the elapsed time is shorter than the first set time, that is, when time required for the temperature detected by the temperature sensor 105 to, after the power feeding was started, rise the first set temperature (for example, 3 degrees) is shorter than the first set time (for example, 1 second) (step S104; Yes), the controller 120 determines that an allowable condition for continuing power feeding is not satisfied (step S104A) and stops the power feeding (step S107). As described above, by causing the power feeding by the power transmitting coil 106 to be stopped when the controller 120 determines that the allowable condition for continuing power feeding is not satisfied, safety in non-contact power feeding can be improved.

In addition, when the controller 120 determines that the allowable condition for continuing power feeding is not satisfied, the controller 120 performs foreign object notification processing of notifying the user of existence of a metal foreign object (step S108) and terminates the power feeding control processing. Specifically, in the processing in step S108, the controller 120 performs notification by the notifier, such as lighting of a lamp like an LED disposed on the outer frame 109 and voice output from a speaker, via the inputter/outputter 130.

A case where, in contrast, in the processing in step S104, the controller 120 determines that the elapsed time is greater than or equal to the n-th set time, that is, a case where, in this example, the controller 120 determines that the elapsed time is greater than or equal to the first set time, is described. When the time required for the temperature detected by the temperature sensor 105 to, after the power feeding was started, rise the first set temperature (for example, 3 degrees) is greater than or equal to the first set time (for example, 1 second) (step S104; No), the controller 120 determines, by the function of the determiner 122, whether or not a comparison criterion is the n-th set temperature that corresponds to the maximum value of n (step S105). Specifically, since the maximum value of n in this example is 5, the controller 120 determines whether or not the comparison criterion is the fifth set temperature in the processing in step S105.

Since, in the processing in step S105, n=1 holds, the comparison criterion is determined not to be the fifth set temperature (step S105; No). The controller 120 determines, by the function of the determiner 122, that the temporary allowable condition for continuing power feeding is satisfied and continues the power feeding (step S109).

In this example, after the processing in step S109, the controller 120 sets n to 2 by adding 1 to n in processing in step S111. Note that the value of n to which 1 is added in the processing in step S111 corresponds to n of the n-th set temperature that is indicated by the set temperature information 112 stored in the storage 110 and the processing in the step S111 can be executed until the value of n reaches the same value as n of the n-th set temperature indicated by the set temperature information 112. That is, when the first to fifth set temperatures are set as the set temperature information 112, step S111 is to be executed until n reaches 5 that corresponds to the fifth set temperature and is subsequently not to be executed.

In addition, when the controller 120, in the case of returning to the processing in step S102 with n set to 2, determines whether or not the temperature rise of the thermal conduction member 103 is greater than or equal to the n-th set temperature in the processing in step S103, the controller 120 determines whether or not the temperature rise is greater than or equal to the second set temperature indicated by the set temperature information 112 at this time.

In addition, in the processing in step S104 performed for the second time, the controller 120 determines whether or not the elapsed time that the controller 120 started to measure in the processing in step S101 is less than the second set time that corresponds to the second set temperature and is indicated by the set time information 113 stored in the storage 110. When the elapsed time is shorter than the second set time, the controller 120 determines that the allowable condition for continuing power feeding is not satisfied and stops the power feeding. In contrast, when the elapsed time is greater than or equal to the second set time, the controller 120 determines that the temporary allowable condition for continuing power feeding is satisfied and continues the power feeding. In this case, the controller 120 sets n to 3 by adding 1 to n and returns to the processing in step S102. Thereafter, the controller 120 similarly repeats the above-described processing.

When the processing in step S111 is executed until n reaches 5 that is the maximum value in this example and the temperature of the thermal conduction member 103 is detected to have risen the fifth set temperature, the controller 120 determines whether or not the elapsed time is less than the fifth set time (step S104). When the controller 120 determines that the elapsed time is shorter than the fifth set time, the controller 120 determines that the allowable condition for continuing power feeding is not satisfied (step S104A) and stops the power feeding (step S107). In contrast, when the elapsed time is greater than or equal to the fifth set time, the controller 120 determines that the allowable condition for continuing power feeding is satisfied since the comparison criterion is the n-th set temperature corresponding to the maximum value of n (step S106). That is, the controller 120 determines that no metal foreign object exists on the coil cover 101 or there exists no metal foreign object the temperature of which reaches a preset temperature (for example, 70 degrees) even when power feeding by the power transmitting coil 106 is continued and causes the power feeding to be continued.

After the processing in step S106, the controller 120 determines whether or not the robot 200 is fully charged, that is, the robot 200 has reached full charge, by the function of the determiner 122 (step S110). Specifically, in the processing in step S110, the controller 120 determines whether or not the robot 200 has reached full charge by confirming whether or not the controller 120 has received a signal indicating that the robot 200 has reached full charge from the robot 200 via the communicator 140.

When, in the processing in step S110, the controller 120 determines that the robot 200 has reached full charge, that is, when the controller 120 receives a signal indicating that the robot 200 has reached full charge from the robot 200 via the communicator 140 (step S110; Yes), the controller 120 directly terminates the power feeding control processing. In contrast, when, in the processing in step S110, the controller 120 determines that the robot 200 has not reached full charge, that is, when the controller 120 has not received a signal indicating that the robot 200 has reached full charge from the robot 200 via the communicator 140 (step S110; No), the controller 120 continues the power feeding until the controller 120 receives a signal indicating that the robot 200 has reached full charge from the robot 200.

As described above, by setting a plurality of timings at which whether or not power feeding is to be continued is determined in place of, when a condition requiring the elapsed time to be greater than or equal to the first set time is satisfied in the determination in step S104 performed for the first time, continuing power feeding until full charge is reached, the safety at the time of power feeding can be further improved.

In addition, when the robot 200 is set on the power feeding device 100, the power feeding control processing is executed, and, when the temperature of the thermal conduction member 103 satisfies a predetermined condition, that is, when the temperature rise of the thermal conduction member 103 is greater than or equal to a predetermined temperature and has reached the predetermined temperature within a predetermined time, the power feeding is caused to be stopped. In other words, when the temperature rise becomes greater than or equal to a preset temperature rise within a predetermined period from the start of power feeding, the power feeding is stopped. Therefore, the safety of power feeding can be improved even when rapid temperature rise occurs, and safety at the time of non-contact charging can be improved.

In addition, although a configuration that determines existence or nonexistence and the like of a metal foreign object, based on a detection result by the temperature sensor 105 and thereby controls power feeding was described above, the embodiment may be configured to use in combination a foreign object detection method prescribed in the Qi standard that is an international standard relating to wireless power feeding. The foreign object detection method is a method of deriving a difference between power transmitted from a power feeding coil and power received by a power receiving coil as power loss and, when the power loss exceeds a threshold value, determining that a metal foreign object exists. Using such a method in combination enables the safety in the non-contact charging to be further improved.

Variations

Note that the present disclosure is not limited to the above-described embodiment and various modifications and applications are possible. For example, the power feeding device 100 and the robot 200 do not have to include all the technical features described in the above-described embodiment and may be a power feeding device and a robot including some components of the components described in the above-described embodiment in such a way that at least one problem in conventional technologies can be solved. In addition, at least some of variations to be described below may be combined.

Figure 7A:
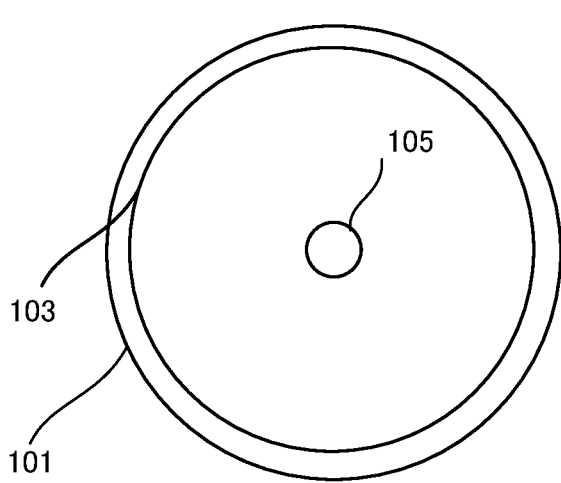
FIG. 7A is a diagram illustrating a coil cover according to the embodiment of the present disclosure when viewed from below.
Figure 7B:
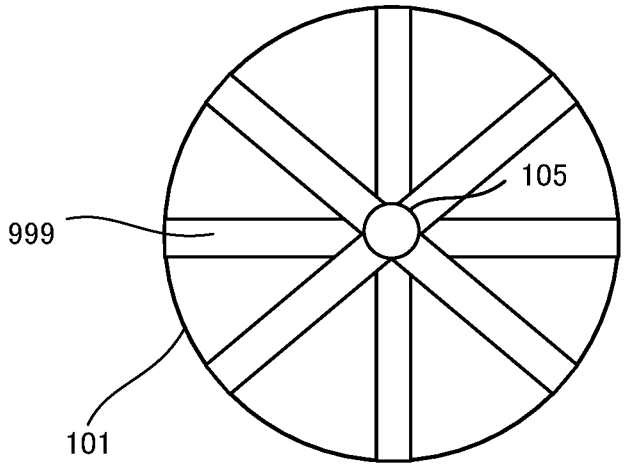
FIG. 7B is a diagram illustrating a coil cover in a variation when viewed from below.

Although, in the above-described embodiment, an example in which the shape of the thermal conduction member 103 is a circle was described, the configuration is only an example. Although, in the above-described embodiment, an example in which, as illustrated in FIG. 7A, the thermal conduction member 103 having the same shape as the shape of the coil cover 101 is disposed on the under surface of the coil cover 101 was described, for example, radial thermal conductive members 999 may be disposed, as illustrated in FIG. 7B. In addition, the radial thermal conductive members 999 may be, as with the thermal conduction member 103, formed of an acrylic material or a silicon-based material or may be formed of a metal, such as an aluminum tape. When the thermal conductive members 999 are formed of a metal, such as an aluminum tape, each of the radial thermal conductive members 999 is only required to be formed to have narrow width in order to prevent the thermal conductive members 999 themselves from generating heat during power feeding.

In addition, although, in the above-described embodiment, an example in which the thermal conduction member 103 is disposed on the under surface of the coil cover 101 was described, the thermal conduction member 103 may be disposed on the upper surface of the coil cover 101. Further, although, in the above-described embodiment, an example in which the thermal conduction member 103 is attached with the thermal conductive double-faced adhesive tape 102 was described, the coil cover 101 is only required to have a thermal conductive material added thereto, and, for example, only the thermal conductive double-faced adhesive tape 102 may be disposed on the coil cover 101 without the thermal conduction member 103 disposed thereon.

In addition, although, in the above-described embodiment, an example in which a set time is set with respect to each set temperature that is set by the set temperature information 112 as the set time information 113 in advance by a user was described, the configuration is only an example. For example, a second set time that is a time later than the first set time may be set. In this case, in the power feeding control processing illustrated in FIG. 6, whether or not the elapsed time exceeds the second set time is only required to be determined as processing after step S104. In addition, the embodiment may be configured to stop power feeding when the elapsed time is shorter than the second set time and continue power feeding when the elapsed time is greater than or equal to the second set time. In addition to the above, a third set temperature and a fourth set temperature may be set. Processing similar to the above-described processing related to the second set time is only required to be performed corresponding to the third set temperature and the fourth set temperature.

In addition, although, in the above-described embodiment, a case where the maximum value of n is 5 was described, the maximum value of n may be 1. That is, only the first set temperature and the first set time may be set. In the case where only the first set temperature and the first set time are set, when the processing in step S104 results in No in the power feeding control processing illustrated in FIG. 6, the power feeding is continued until full charge is reached. That is, the embodiment may be configured to determine whether the allowable condition for continuing power feeding is satisfied or the allowable condition for continuing power feeding is not satisfied by the determination in step S104 performed for the first time.

In addition, although, in the above-described embodiment, a case where, when the allowable condition for continuing power feeding is determined to be satisfied based on a determination result regarding the n-th set temperature and the n-th set time corresponding to the maximum value of n, the power feeding is continued until full charge is reached was described, the case is only an example. For example, the embodiment may be configured to set the n-th set temperature and the n-th set time in such a way that full charge is reached during a cycle before n reaches the maximum value.

In addition, although an example in which, in step S103 in the power feeding control processing illustrated in FIG. 6, whether or not temperature rise of the thermal conduction member 103 is greater than or equal to the n-th set temperature is determined was described, whether or not temperature rise of the thermal conduction member 103 exceeds the n-th set temperature may be determined. In addition, although an example in which, in the processing in step S104, whether or not the elapsed time is less than the n-th set time is determined was described, whether or not the elapsed time is less than or equal to the n-th set time may be determined.

In addition, although, in the above-described embodiment, a configuration of determining whether or not there is a possibility that the temperature of a metal foreign object reaches 70 degrees is determined based on speed of temperature change that is detected by the temperature sensor 105 was described, the configuration is only an example. For example, the controller 120 may be configured to determine whether or not the temperature of the thermal conduction member 103 is greater than or equal to 70 degrees. Specifically, the controller 120 may be configured to directly determine whether or not the temperature of the thermal conduction member 103 that is acquired in the processing in step S102 is greater than or equal to 70 degrees that is set in advance.

When the temperature of the thermal conduction member 103 is determined to be greater than or equal to 70 degrees, a metal foreign object may be determined to exist on the coil cover 101, which serves as a placement portion on which the robot 200 is placed, by the function of the determiner 122 and the controller 120 may be configured to stop power feeding by the function of the power feeding controller 121.

Although, in the above-described embodiment, an example in which the controller 120 is configured to, without distinguishing a case where no metal foreign object exists and a case where, although a metal foreign object exists, temperature of the metal foreign object does not reach 70 degrees from each other, determine that both cases collectively satisfy the allowable condition for continuing power feeding was described, the controller 120 may be configured to perform other determination. For example, the controller 120 may be configured to set a condition for distinguishing a case where no metal foreign object exists and a case where, although a metal foreign object exists, temperature of the metal foreign object does not reach 70 degrees from each other and perform determination by distinguishing the case where no metal foreign object exists and the case where, although a metal foreign object exists, temperature of the metal foreign object does not reach 70 degrees from each other.

In addition, although, in the above-described embodiment, an example in which power feeding by the power feeding device 100 is started when the robot 200 is placed on the power feeding device 100 was described, the configuration is only an example. As timing at which power feeding by the power feeding device 100 is started, another event may be set. For example, the controller 120 may be configured to start power feeding when a predetermined time has elapsed since the robot 200 was detected to be placed on the power feeding device 100. In addition, the controller 120 may be configured to start power feeding when an instruction to start power feeding arrives from the user after the robot 200 was placed on the power feeding device 100.

In addition, although, in the above-described embodiment, a case where a metal foreign object exists as a foreign object was described, the case is only an example, and any type of foreign object is applicable as long as the foreign object is an object that generates heat when power feeding by the power transmitting coil 106 is performed.

In addition, in the above-described embodiment, the description was made assuming that programs of power feeding control processing and the like that the power feeding device 100 executes are stored in advance in the storage 110. However, a computer capable of executing each piece of processing described above may be configured by storing and distributing the programs in a non-transitory computer-readable recording medium, such as a flexible disk, a compact disc read only memory (CD-ROM), a digital versatile disc (DVD), a magneto-optical disc (MO), a memory card, and a USB memory, and reading and installing the programs into the computer.

Note that it is also possible to superimpose programs achieving the functions described above on a carrier wave and distribute the programs via a communication network. For example, the programs may be posted on a bulletin board system (BBS) on the communication network and distributed via the network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A power feeding device, comprising:
a placement portion including a placement surface on which a power receiving device is placed;
a power feeder including a coil for feeding power to the power receiving device placed on the placement surface;
a thermal conduction member disposed at a location that is located between the power receiving device and the coil in a case where the power receiving device is placed on the placement surface and having a higher thermal conductivity than the placement portion;
a sensor to detect temperature of the thermal conduction member;
a processor to perform control of stopping power feeding by the power feeder in a case where after start of power feeding by the power feeder at a predetermined timing, temperature of the thermal conduction member detected by the sensor satisfies a predetermined condition;
a wiring board on which the sensor is mounted, the wiring board being for transmitting to the processor information of the temperature detected by the sensor; and
a pressing member arranged with in close contact with the wiring board to press the wiring board against the thermal conduction member, wherein
the pressing member has a through-hole, and
the sensor is disposed inside the through-hole such that the pressing member covers a circumference of the sensor.

2. The power feeding device according to claim 1, wherein, in a case where, within a predetermined period from start of power feeding by the power feeder, temperature of the thermal conduction member detected by the sensor rises a predetermined temperature width or more, the temperature width being set corresponding to the predetermined period, the processor determines that the predetermined condition is satisfied and stops power feeding by the power feeder.

3. The power feeding device according to claim 1, wherein, in a case where a time at which temperature of the thermal conduction member detected by the sensor has risen a predetermined temperature width or more is within a predetermined period from start of power feeding by the power feeder, the processor determines that the predetermined condition is satisfied and stops power feeding by the power feeder.

4. The power feeding device according to claim 2, wherein a plurality of the predetermined temperature widths is set and the predetermined periods different from one another are set corresponding to each of the plurality of predetermined temperature widths, and in a case where the predetermined condition is determined not to be satisfied with respect to all the predetermined temperature widths and the predetermined periods corresponding to the predetermined temperature widths, the processor causes power feeding by the power feeder to be continued.

5. The power feeding device according to claim 1, wherein, in a case where temperature of the thermal conduction member detected by the sensor rises a predetermined temperature width or more within a predetermined period from start of power feeding by the power feeder, the processor determines that a foreign object exists on the placement surface.

6. The power feeding device according to claim 2, wherein, in a case where temperature of the thermal conduction member detected by the sensor rises a predetermined temperature width or more within a predetermined period from start of power feeding by the power feeder, the processor determines that a foreign object exists on the placement surface.

7. The power feeding device according to claim 3, wherein, in a case where temperature of the thermal conduction member detected by the sensor rises a predetermined temperature width or more within a predetermined period from start of power feeding by the power feeder, the processor determines that a foreign object exists on the placement surface.

8. The power feeding device according to claim 3, wherein the thermal conduction member is disposed on an opposite side to the placement surface of the placement portion.

9. The power feeding device according to claim 5, wherein the thermal conduction member is attached to the placement portion by a thermal conductive adhesive member.

10. A power feeding device, comprising:

a placement portion including a placement surface on which a power receiving device is placed and configured to function as a thermal insulation layer;

a power feeder including a coil for feeding power to the power receiving device placed on the placement surface;

a thermal conduction member disposed on a surface on an opposite side to the placement surface side of the placement portion and configured to function as a thermal conduction layer;

a sensor to detect temperature of the thermal conduction member;

a processor to perform control of stopping power feeding by the power feeder in a case where after start of power feeding by the power feeder at a predetermined timing, temperature of the thermal conduction member detected by the sensor satisfies a predetermined condition;

a wiring board on which the sensor is mounted, the wiring board being for transmitting to the processor information of the temperature detected by the sensor; and a pressing member arranged with in close contact with the wiring board to press the wiring board against the thermal conduction member, wherein the pressing member has a through-hole, and the sensor is disposed inside the through-hole such that the pressing member covers a circumference of the sensor.

11. The power feeding device according to claim 1, wherein the pressing member is formed of a material that has elasticity, and the through-hole of the pressing member is provided at a position corresponding to a center of the thermal conduction member is disposed to cover a circumference of the sensor.

12. The power feeding device according to claim 1, wherein the sensor is in contact with the wiring board at a portion that is different from a portion at which the pressing member and the wiring board are in contact with each other.

13. The power feeding device according to claim 1, wherein the placement portion is configured as a thermal insulation layer.

14. The power feeding device according to claim 10, wherein the pressing member is formed of a material that has elasticity, and the through-hole of the pressing member is provided at a position corresponding to a center of the thermal conduction member is disposed to cover a circumference of the sensor.

15. The power feeding device according to claim 10, wherein the sensor is in contact with the wiring board at a portion that is different from a portion at which the pressing member and the wiring board are in contact with each other.

* * * * *